United States Patent Office 2,708,154
Patented May 10, 1955

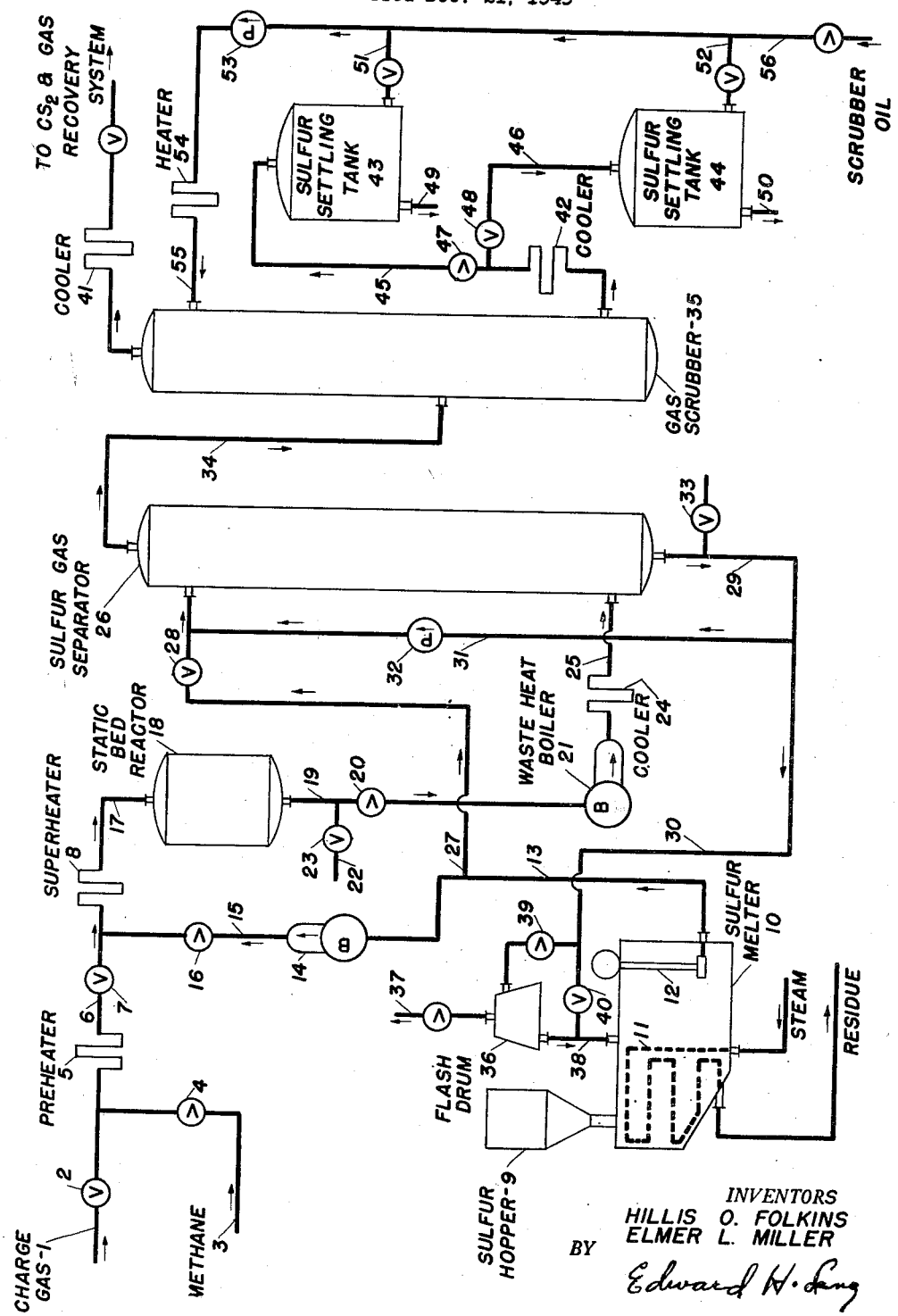

2,708,154

PROCESS FOR CARBON DISULFIDE PRODUCTION

Hillis O. Folkins, Crystal Lake, and Elmer L. Miller, Evanston, Ill., assignors, by mesne assignments, to Food Machinery and Chemical Corporation, New York, N. Y., a corporation of Delaware Application December 21, 1949, Serial No. 134,328

4 Claims. (Cl. 23—206)

This invention relates to a method for the preparation of carbon disulfide by the reaction of sulfur with hydrocarbons and is more particularly concerned with a method of preventing side reactions and tar formation, and maintaining catalyst activity during such reaction.

When the feed hydrocarbon vapors are composed substantially only of $C_1$ and $C_2$ hydrocarbons, namely, methane and ethane, the reaction progresses with the production of carbon disulfide and hydrogen sulfide and little or no high molecular weight side reaction products result. Difficulty is experienced, however, when a feed stock, comprised predominantly of $C_1$, $C_2$ and $C_3$ hydrocarbons, but also containing substantial amounts of hydrocarbons heavier and/or more reactive than the $C_3$ hydrocarbons, is subjected to the same reaction with sulfur. When a feed stock, of which the main component is methane such as natural or manufactured gas, but which contains a minor portion of hydrocarbons having four or more carbon atoms per molecule, is reacted with sulfur vapor or liquid to form carbon disulfide, the reaction of the $C_4$ and heavier hydrocarbon fraction of the feed stock to form carbon disulfide is accompanied by the formation of viscous high molecular weight polymeric sulfur containing compounds. This is due to side reactions which degrade into tar and coke, leading to decreased catalyst activity, decline in production and difficulties in catalyst regeneration. Consequently, continuous methods for the preparation of carbon disulfide from hydrocarbon feed stocks containing components which tend to decompose into tar and coke or yield viscous polymers in the presence of sulfur have been beset by inefficiency, loss of catalyst activity and troublesome plugging of equipment. Further, the products of these side reactions seem to be autocatalytic with time to the detriment of carbon disulfide formation.

We have discovered a process for catalytically reacting gaseous hydrocarbons, particularly hydrocarbon gases comprised mainly of ethane and/or propane, with sulfur vapor to form carbon disulfide, in which side reactions to form tar-like materials are eliminated by maintaining in or adding thereto methane or inert gases.

Our experiments have indicated that the addition of a minor amount of methane or inert gas will eliminate side reactions. A charge gas is used comprising mainly ethane and/or propane substantially free of higher molecular weight hydrocarbons. Methane is preferred for this function since it serves a double purpose, that of eliminating side reactions and reacting with the sulfur to form carbon disulfide. However, such gases as nitrogen, carbon disulfide, hydrogen sulfide and sulfur dioxide come within the definition of inert gases as used herein and may be used in place of methane. A definite percentage of methane or inert gas will be required to bring about the desired result and will depend on the nature of the charge gas. If the charge gas is predominately ethane, less methane or inert gas will be required than is necessary in connection with a gas predominately propane. Generally the volume of methane required will range from 2 to 30 mol percent of the total resulting hydrocarbon gas mixture but larger amounts of methane can be present in the gas without deleteriously affecting the process.

In other words, we have found that by the removal of substantially all of the $C_4$ and higher hydrocarbons from a charge gas, especially natural gas, it is possible to produce carbon disulfide therefrom by reaction with sulfur vapors in the presence of a catalyst and prevent catalyst decline during the reaction by injection of or maintenance of controlled and minimum amounts of $C_1$ hydrocarbon or inert gases. This same reaction conducted with a charge gas containing substantial amounts of $C_4$ and higher hydrocarbons would not be possible without a small amount of side reaction and catalyst degradation even with the addition of large amounts of methane or inert gases, unless operating conditions are markedly altered.

Accordingly, the main purpose of this invention is to improve the efficiency of processes for the conversion of ethane and/or propane into organic sulfur compounds, particularly the conversions of these gases into carbon disulfide.

Another purpose of this invention is to eliminate side reactions in the preparation of carbon disulfide from ethane and/or propane hydrocarbon gases.

It is another purpose of this invention to provide an improved process for the conversion of saturated hydrocarbon gases containing 2 and 3 carbon atoms per molecule into sulfur-containing organic compounds in which the catalyst efficiency is maintained at a high level.

And as a further purpose this invention is directed to a process for eliminating tar and coke formation and catalyst decline during the preparation of carbon disulfide from $C_2$ and $C_3$ hydrocarbons by injecting into the hydrocarbon reactants a measured amount of methane or inert gases.

A still further object of this invention is to provide a method of producing carbon disulfide from a charge mixture of saturated hydrocarbons without the necessity of the removal of the $C_3$ or lower hydrocarbons from the charge mixture.

Referring to the accompanying drawing, there is represented a diagrammatic elevational view of one form of heater, reactor and sulfur recovery section of apparatus useful in carrying out the invention.

Reference is now made to the drawing in which the numeral 1 indicates a line controlled by valve 2 for charging hydrocarbon gas to the process. Line 3 controlled by valve 4 indicates the means for introducing methane or inert gas into the system. The charge gas after having its $C_4$ content reduced to a minimum and containing a minimum operable amount of methane or inert gas through adjustment of the charge gas composition is heated to approximately 700° to 1200° F. in heater 5. The temperature will be dependent upon the nature of the charge and upon conditions of operation. Temperatures as high as 1500° F. are operable, but care should be taken to avoid cracking conditions of time and temperature. In most operations it is advantageous to operate the heater so that the exit gases retain a temperature below threshold cracking temperature. The preheated charge gas passes from the heater 5 through line 6 controlled by valve 7 to superheater 8, after being mixed with controlled amounts of sulfur vapors as will be described. This arrangement allows for the manipulation of charge gas, methane and sulfur vapor mixing in a manner calculated to gain the most efficiency from the process.

In superheater 8 the mixed stream is heated to a reaction temperature of approximately 850° to 1300° F., but preferably about 1100° to 1175° F.

Solid sulfur is fed from sulfur hopper 9 into the sulfur melter 10, which is heated by steam coil 11. Heat is applied by means of the steam coil 11 so that the molten sulfur is kept at a temperature between approximately 250° to 300° F. and preferably about 270° F. Obviously those temperatures are to be avoided at which high viscosity sulfur forms. The molten sulfur is pumped from the melter 10 by means of submerged centrifugal pump or other pump 12 suitable for handling molten sulfur through line 13 at pressures up to 100 pounds per square inch to sulfur boiler 14. The pressures under which the molten sulfur will be moved depend upon the operation pressure maintained in the reactor and on the design of equipment in general. In sulfur boiler 14 the sulfur is heated to a temperature sufficiently high to vaporize it, as for example 850° to 1200° F. under given operating pressures and the sulfur vapors pass through line 15 controlled by valve 16 to join and mix with the charge gas in line 6. By this procedure the charge gas after adjustment of the $C_4$ hydrocarbon content and after preheating is mixed with sulfur vapors and the mixture subjected to superheating. The mixed stream of charge gas and sulfur vapors should be in contact only a very short time to prevent thermal reaction prior to reaction in the presence of a catalyst.

An alternate procedure of mixing and heating may be used wherein instead of mixing the charge gas and the sulfur vapors at the outlet of the sulfur boiler, the charge gas is introduced into the sulfur stream entering the sulfur boiler and the sulfur vaporized in the presence of the charge gas, provided the charge gas on introduction thereto is of sufficient temperature to prevent cooling of the sulfur. Another alternative is to heat the sulfur and charge gas separately and inject the heated reactants directly into the catalyst chamber in order to prevent substantial reaction outside the catalyst bed. Also the addition of methane or inert gas, as nitrogen, can take place before the charge gas mixes with the sulfur vapors or after mixture therewith. Another method would be to inject the methane or nitrogen into the static bed reactor during the reaction of the charge gas and sulfur vapors therein.

That portion of the equipment which is in contact with sulfur-bearing vapors at elevated temperature is best constructed of a material which is resistant to the corrosive action of sulfur. Various stainless steel alloys, such as one containing 27 percent chromium, one containing 25 percent chromium and 20 percent nickel or an alloy containing 16 to 18 percent chromium, 10 to 14 percent nickel and 2 to 3 percent molybdenum have proved effective. Other materials of construction include aluminum coated steels, stainless steel alloys, refractory linings, and various types of stainless steels, such as those of the 18 percent chromium, 8 percent nickel series. The sulfur boiler 14 may be a tube or coil constructed from an alloy or other material highly resistant to sulfur corrosion. Superheater 8 is necessarily constructed of corrosion resistant alloys also.

The superheated reactants leaving the superheater 8 at temperatures of about 1100° to 1175° F. pass via line 17 to the upper portion of reactor 18. As shown in the drawing, reactor 18 is of the static bed type, but it is to be understood that reactor 18 may be replaced by a moving bed or fluidized catalyst chamber type of reactor if desired. Since in preparing carbon disulfide in accordance with our invention, the catalyst retains its activity almost indefinitely without regeneration, it is necessary to employ only one reactor, although the use of a standby reactor in case of emergency breakdown is not excluded. Runs have been conducted continuously for periods of 6 weeks without the necessity of regeneration of the catalyst. It is good practice to shut down the equipment and check it thoroughly for possible weak spots due to corrosion. During this check period the standby reactor can be cut into the system in order to make the process continuous.

The reactor may be operated isothermally or adiabatically. In either case, the suitable catalysts are silica gel, activated alumina (including alumina gel), catalytic clays, bauxite and synthetic silica-alumina catalysts containing between 2 and 10 percent of silica or such catalysts impregnated with promoters such as chromium, iron, molybdenum, manganese and vanadium oxides or sulfides for promoting the formation of carbon disulfide. The silica gel, alumina or clay catalyst may be used alone or in admixture with one or more metal compounds of metals of groups V, VI, VII and VIII of the periodic table. Exact conditions of pressure and temperature needed for adiabatic or isothermal operation may be varied. In practicing adiabatic operation, it is preferred to heat the reactants sufficiently above desired reaction temperature to compensate for temperature drop through the reactor except in higher parts of the temperature range where the reaction is exothermic. Ordinarily 25° to 50° F. over desired reaction temperature will be sufficient.

The conditions maintained within the reactor are broadly 850° to 1300° F., pressures 15 to 500 pounds per square inch gauge and with a total space velocity of gas and sulfur of 400 to 5000 S. T. P. These conditions are variable, i. e., space velocities will vary depending upon the conditions of operation employed. For purposes of this description and the following more detailed discussion of the invention, space velocity is defined as the ratio of total volume of gases (sulfur vapor calculated as the $S_2$ modification) at 32° F. and 14.7 pounds absolute pressure passing over the catalyst per hour to the volume of space which the catalyst occupies. The process may be carried out at subatmospheric, atmospheric or at superatmospheric pressures up to 500 pounds per square inch or above. The preferred range is from atmospheric to about 100 pounds per square inch.

Variations of the conditions of temperature and pressure are allowable over a wide range with satisfactory yields being obtained, but those conditions which maintain the reactants in the vapor phase are preferred. Any desired ratio of sulfur and hydrocarbons may be used but it is preferred to use an amount of sulfur in excess of the stoichiometric ratio required to yield carbon disulfide and hydrogen sulfide, such excess being of the order of about 10 to 30 molal per cent. In reactor 18 the reactants combine to form carbon disulfide and hydrogen sulfide exclusive of higher molecular weight by-products and tar or coke, according to the teachings of this invention. There is present, of course, some unreacted charge gas and sulfur in the effluent from the reactor 18. The separation of the products and excess reactants is the next step in the process.

After the formation of carbon disulfide in the reactor 18, the products pass through line 19 controlled by valve 20 to the waste heat boiler 21. Draw-off line 22 with control valve 23 is provided for withdrawing samples to observe the color of the sulfur. In the waste heat boiler 21 the effluent products pass in indirect heat exchange with water or steam to produce high pressure steam for use in reboilers and elsewhere in the system. The reaction products leave the waste heat boiler 21 at a temperature of approximately 450° to 500° F., pass through the cooler 24 where the temperature is reduced to approximately 250° to 300° F. and finally pass via line 25 to lower portion of the sulfur-gas separator 26. Instead of using a waste heat boiler and subsequent water cooler, the product cooling process may be conducted in several ways, including the use of multi-finned radiating surfaces or conventionally designed water coolers.

The sulfur-gas separator 26 may be a tower so designed to give contact between the rising gases and the various bodies of liquid sulfur supported on the plates, such as, for example, bubble plates, Raschig rings or other contact surfaces. During the operation of separator 26, the plates or baffles are maintained substantially flooded with liquid sulfur at about 270° F. by the action of pump 12, in sulfur melter 10, the molten sulfur flowing from said pump through lines 13 and 27 via valve 28 to the upper part of the separator 26, after flowing through the separator the liquid sulfur collects in the bottom of the separator and is returned to the sulfur melter 10 for recycle via lines 29 and 30. Absorption of the major portion of condensed and unreacted sulfur dust or particles is thus accomplished by the circulating molten sulfur stream. Assurance of a continuous flooding action in the separator may be attained by circulation of a part of the flow of molten sulfur from the bottom of separator 26 through lines 29 and 31 by pump 32. Sulfur-test drawoff valve 33 is provided for periodic removal of samples of recycle sulfur for color tests and other measurements. Carbon disulfide and hydrogen sulfide, together with any reacted hydrocarbon gas and any remaining sulfur particles exit through the top of the separator 26 and pass via line 34 to gas scrubber 35. Generally, the pressure in the separator 26 will be sufficient to force the sulfur from the bottom of the separator to the melter 10 without pumping. The hazard of fire in the melter 10 due to absorbed carbon disulfide is overcome by flashing off the carbon disulfide from the recycle sulfur in the flash drum 36 maintained at atmospheric pressure. The carbon disulfide so separated may be exhausted to the air or withdrawn by line 37 for recovery. The molten sulfur is returned from the flash drum 36 to the sulfur melter 10 through line 38. By manipulation of appropriate valves 39 and 40, the recycle sulfur may be diverted either to the flash drum 36 or to the sulfur melter 10.

The remaining sulfur dust or sulfur particles in the reaction products leaving sulfur separator 26 via line 34 is removed by a stream of scrubber oil in gas scrubber 35. Various lubricating and light gas oil fractions are suitable for use as a scrubber oil. The gas scrubber 35 is fitted with suitable contacting surfaces, such as Raschig rings through which the reaction products pass upwardly to contact the downward flowing stream of scrubber oil. The temperature in the scrubber will be approximately the same as in the separator. The cleaned reaction products, that is with sulfur removed, are withdrawn through the top of gas scrubber 35 and pass through cooler 41, for cooling to a temperature of 100° F. or less, before passing to a carbon disulfide and gas recovery system (not shown). The carbon disulfide and gas recovery system serves to separate hydrogen sulfide and unreacted hydrocarbons. As carbon disulfide absorber oil, hydrocarbon fractions such as petroleum naphtha having a boiling range of 250° to 400° F. may be used, or such solvents as benzene and o-dichlorobenzene, etc. Thereafter the carbon disulfide is stripped from the absorber oil and fractionated to a finished product.

Scrubber oil containing dissolved sulfur passes from the bottom of scrubber 35 to cooler 42, where a temperature reduction to 100° F. or lower takes place, and from thence the cooled scrubber oil passes into the sulfur separator tanks 43 and 44 via lines 45 and 46 and valves 47 and 48. The provision of two settling tanks affords means for the continuous operation of the gas scrubber system, for while sulfur, which has been crystallized from the oil at 100° F. is settling in one tank, the balance of the system may be operated to provide oil circulation to the gas scrubber 35 followed by collection in the second tank. Separation of the sulfur sludge is accomplished by withdrawal through lines 49 and 50 after the settling period, either before or after the oil has been withdrawn. For certain purposes, it may be advantageous to withdraw the oil and crystallized sulfur from the settling tanks before complete separation has occurred. Lines 51 and 52 and pump 53 provide means for the recirculation of scrubber oil from the tanks through heater 54 where it is heated to 250° to 300° F. before return via line 55 to the gas scrubber 35. Make-up scrubber oil may be added through line 56 as required.

The scrubber oil may be recycled indefinitely or withdrawn and burned or used to make high sulfur cutting oils or extreme pressure lubricants. Filters or centrifuges may be provided to separate the sulfur from the oil instead of the settling tanks.

In order to demonstrate the effectiveness of our invention in suppressing tar formation the following examples are given:

*Example 1.*—A charge gas comprised of 98.6% ethane and 1.4% propane is reacted with sulfur vapor in stoichiometric proportions in the presence of silica gel catalyst at 1022° F., atmospheric pressure and at a total STP space velocity (sulfur calculated as $S_2$) of 600. A conversion of only 35 percent to carbon disulfide was obtained and the recovered sulfur was reddish brown indicating the presence of tar-forming side reactions (analysis of recycle sulfur showed 0.15 percent carbon).

*Example 2.*—In a second experiment, to the same charge gas, methane was added so that the resulting hydrocarbon charge consisted of 79.0 mol percent original gas plus 21.0 mol percent methane. This mixture was passed with sulfur vapor under the same conditions as above over the silica gel catalyst. A conversion, based on the total charge, of 76 percent was obtained. Analysis of the residual hydrocarbon gas showed that the heavier hydrocarbon had reacted preferentially to the extent of 94 percent of the ethane charged and that a considerable portion (8%) of the methane had reacted also. Recycle sulfur remained bright yellow and had a carbon content of 0.04 percent which is equal or less than that of fresh sulfur.

*Example 3.*—In a third experiment a gas containing 90 mol percent propane and 10 mol percent methane was reacted with sulfur vapor in 75 percent excess in the presence of silica gel catalyst, essentially atmospheric pressure, a temperature of 1112° C. and at a total space velocity of 1200. Conversion remained high, no increase in pressure occurred, and the unreacted sulfur remained clear, showing the absence of tar-forming side reactions.

*Example 4.*—In a similar experiment in which conditions were maintained the same as those above, with the exception that no methane was charged and the hydrocarbon reactant was essentially propane, high initial conversion was attained but in a short time, within 30 minutes, some tar formation had occurred and a decrease in conversion was evident.

In Example 1 above, it will be noted that when a charge stock composed of almost pure ethane (98.6%) and no methane is used, the initial conversion is about 76 percent. This conversion soon drops to around 35 percent showing a definite decline in catalyst activity. Referring to Example 2, the charge gas containing about 78 percent ethane and 21 percent methane displayed a constant conversion rate of around 75 percent with no catalyst decline. Example 4 shows that when using substantially pure propane, catalyst decline is soon experienced which makes further operation uneconomical. A comparison of Examples 3 and 4 shows that in the absence of methane even with an excess of sulfur, propane cannot be efficiently converted to carbon disulfide without the formation of high molecular weight by-products and tar.

Additional embodiments of our invention will become apparent from the following claims.

What is claimed is:

1. The method of preventing tar and coke formation in the reaction zone during the preparation of carbon disulfide by reaction of sulfur with a hydrocarbon gas consisting of $C_2$ and $C_3$ hydrocarbons with the $C_3$ hydrocarbons in the major proportion and in which all the hydrocarbons are saturated, said reaction being in the presence of a catalyst capable of promoting the formation of carbon disulfide therefrom in a reaction zone maintained at a temperature of about 850° to 1300° F. which consists in charging to said reaction zone said hydrocarbon gas devoid of $C_4$ and higher molecular weight hydrocarbons and mixed with not less than 2 nor more than 30 mol percent of methane.

2. The method of preventing tar and coke formation in the reaction zone during the preparation of carbon disulfide by reaction of sulfur with a hydrocarbon gas containing predominantly $C_3$ hydrocarbons and in which all the hydrocarbons are saturated, said reaction being in the presence of a catalyst capable of promoting the formation of carbon disulfide therefrom in a reaction zone maintained at a temperature of about 850° to 1300° F. which consists in charging to said reaction zone said hydrocarbon gas devoid of $C_4$ and higher molecular weight hydrocarbons and mixed with not less than 2 nor more than 30 mol percent of methane.

3. The method in accordance with claim 1 in which the hydrocarbon gas charged to the reaction zone is prepared from natural gas.

4. The method in accordance with claim 2 in which the hydrocarbon gas charged to the reaction zone is prepared from natural gas.

References Cited in the file of this patent

UNITED STATES PATENTS

| | | |
|---|---|---|
| 1,541,514 | Laird | June 9, 1925 |
| 1,904,439 | Freyermuth | Apr. 18, 1933 |
| 2,187,393 | De Simo | Jan. 16, 1940 |
| 2,330,934 | Thacker | Oct. 5, 1943 |
| 2,335,855 | Hall | Dec. 7, 1943 |
| 2,369,377 | Thacker | Feb. 13, 1945 |
| 2,568,121 | Folkins et al. | Sept. 18, 1951 |
| 2,636,810 | Marisic | Apr. 28, 1953 |

FOREIGN PATENTS

| | | |
|---|---|---|
| 293,172 | Great Britain | July 5, 1928 |